(12) United States Patent
Brochard (10) Patent No.: US 9,418,140 B2
(45) Date of Patent: Aug. 16, 2016

(54) METHOD OF UPDATING AN INVERTED INDEX, AND A SERVER IMPLEMENTING THE METHOD

(75) Inventor: Pierre Brochard, Saint Cheron (FR)

(73) Assignee: Commissariat A L'Energie Atomique Et Aux Energies Alternatives, Paris (FR)

(*) Notice: Subject to any disclaimer, the term of this patent is extended or adjusted under 35 U.S.C. 154(b) by 278 days.

(21) Appl. No.: 13/252,567

(22) Filed: Oct. 4, 2011

(65) Prior Publication Data

US 2012/0089611 A1    Apr. 12, 2012

(30) Foreign Application Priority Data

Oct. 6, 2010 (FR) ...................................... 10 58095

(51) Int. Cl.
*G06F 7/00* (2006.01)
*G06F 17/30* (2006.01)

(52) U.S. Cl.
CPC .... *G06F 17/30622* (2013.01); *G06F 17/30625* (2013.01)

(58) Field of Classification Search
CPC ................ G06F 17/30622; G06F 17/30625
See application file for complete search history.

(56) References Cited

U.S. PATENT DOCUMENTS

| | | | | |
|---|---|---|---|---|
| 5,819,292 A * | 10/1998 | Hitz | ................... | G06F 11/1435 707/999.203 |
| 5,852,822 A * | 12/1998 | Srinivasan | ........ | G06F 17/30327 |
| 6,349,308 B1 * | 2/2002 | Whang | ............. | G06F 17/30327 |
| 7,149,748 B1 * | 12/2006 | Stephan | ............ | G06F 17/30622 707/742 |
| 2003/0101183 A1 * | 5/2003 | Kabra | ............... | G06F 17/30008 |
| 2003/0163302 A1 * | 8/2003 | Yin | ...................... | G06F 17/2775 704/9 |
| 2003/0225779 A1 | 12/2003 | Matsuda | | |
| 2004/0064442 A1 * | 4/2004 | Popovitch | ........................ | 707/3 |
| 2004/0093323 A1 * | 5/2004 | Bluhm | .............. | G06F 17/30011 |
| 2005/0177554 A1 * | 8/2005 | Peltonen | .......... | G06F 17/30631 |
| 2007/0112714 A1 * | 5/2007 | Fairweather | ........... | G06F 8/427 706/46 |
| 2007/0233649 A1 * | 10/2007 | Wang | ................ | G06F 17/30616 |
| 2007/0255698 A1 * | 11/2007 | Kaminaga | ......... | G06F 17/30522 |
| 2008/0086457 A1 * | 4/2008 | Fei | .................... | G06F 17/30864 |

OTHER PUBLICATIONS

Chen, Ing-Ray, "A Degradeable Blink-Tree with Periodic Data Reorganization", The Computer Journal, vol. 38, No. 3, 1995, pp. 245-252.*
"A Peer-to-Peer Inverted Index Implementation for Word-Based Content Search", Nuno Alberto Ferreira Lopes, University Paper, Oct. 2003, 8 pages.
"Optimizations for Dynamic Inverted Index Maintenance", Doug Cutting et al., Proceedings of the 13th Annual International ACM Sigir Conference on Research and Development in Information Retrieval, Sigir 1990, 7 pages.

* cited by examiner

Primary Examiner — Tony Mahmoudi
Assistant Examiner — Michael Le
(74) Attorney, Agent, or Firm — The Webb Law Firm (57) ABSTRACT

A method of updating an inverted index from at least one electronic document in which each electronic document is constituted by at least one ordered set of objects comprises is described. The method includes, for each object, identifying a descriptor of the object where the descriptor is represented in the form of a tree and then determining a terminal leaf of the tree. Subsequently, a packet of information pointed to by the leaf is updated where the packet of information includes at least a list of documents that include the object.

14 Claims, 7 Drawing Sheets

METHOD OF UPDATING AN INVERTED INDEX, AND A SERVER IMPLEMENTING THE METHOD

The present invention lies in the field of systems for managing a set of electronic documents.

BACKGROUND OF THE INVENTION

In this document, the concept of an "electronic" document should be understood broadly to cover the representation of a document in the form of a digital data structure that can be stored in the memory of a computer and that can be sent from one computer to another.

In the field of indexing electronic documents, it is known to consider each electronic document as an ordered set of objects (words, fields, . . . ) and to prepare an inverted index of those objects, as explained below with reference to FIG. 1.

That figure shows a document base BDOC having three electronic documents DOC1, DOC2, and DOC3 together with an inverted index IDX1 of the document base.

In this example, each document may be considered as an ordered set of words; for example, the document DOC1 is the ordered set of words "the" "car", "is", and "red".

Figure 1:
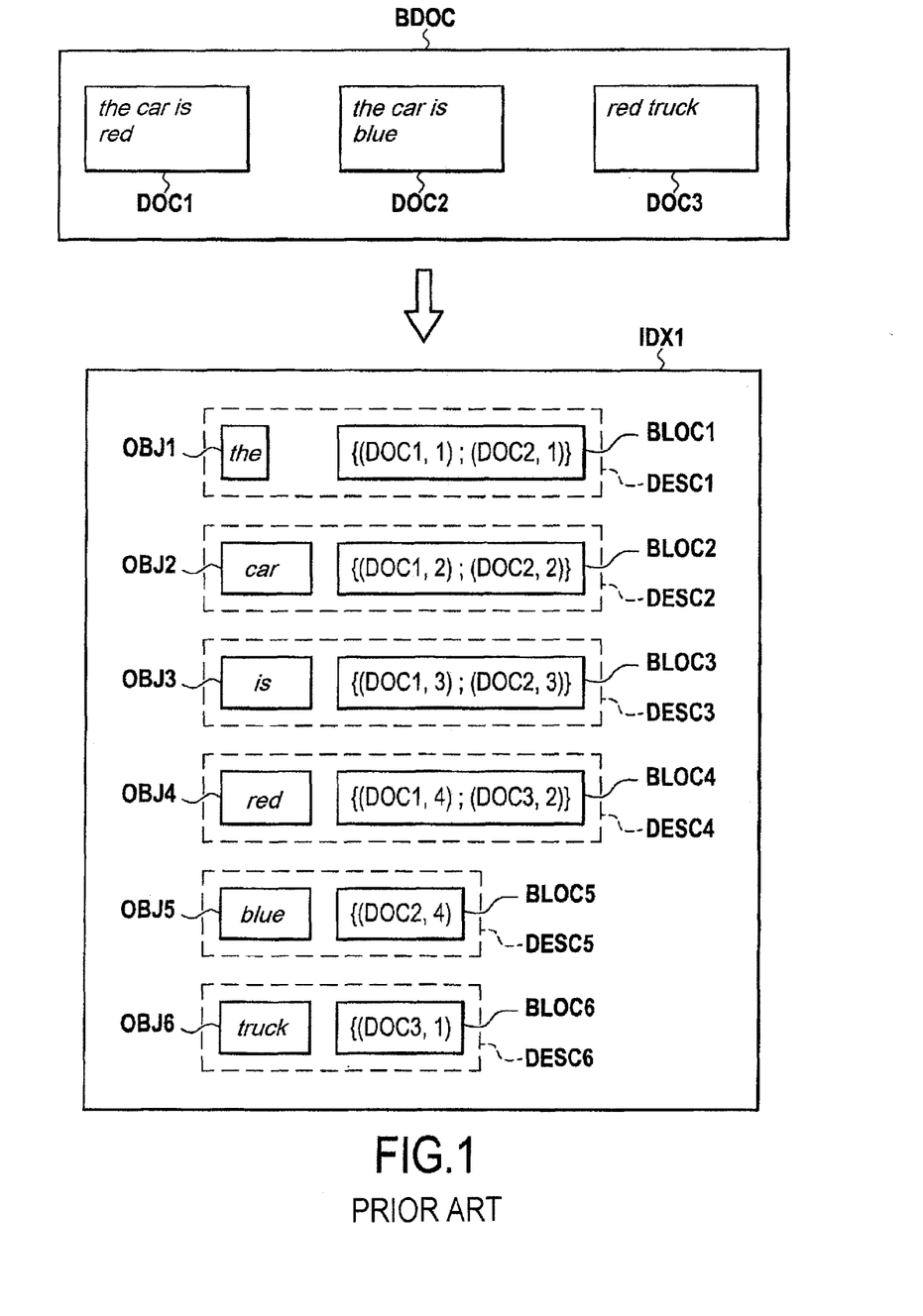
FIGS. 1 and 2, described above, show document bases and inverted indexes obtained using methods of the present state of the art.

In the set of FIG. 1, the document base BDOC thus has six words OBJ1 to OBJ6, i.e. the words "the", "car", "is", "red", "blue", and "truck".

For each word (e.g. OBJ1, "the") the inverted index IDX1 puts into association an information block (BLOC1) comprising:
  the documents (DOC1, DOC2) in the document base (BDOC) that include said word; and
  the position of the word in said document.

For example, the word "the" occupies the first position in each of documents DOC1 and DOC2.

It is also known to consider a document as an ordered set of fields, where a field is an identifiable portion of the document comprising at least a name and a content.

Figure 2:
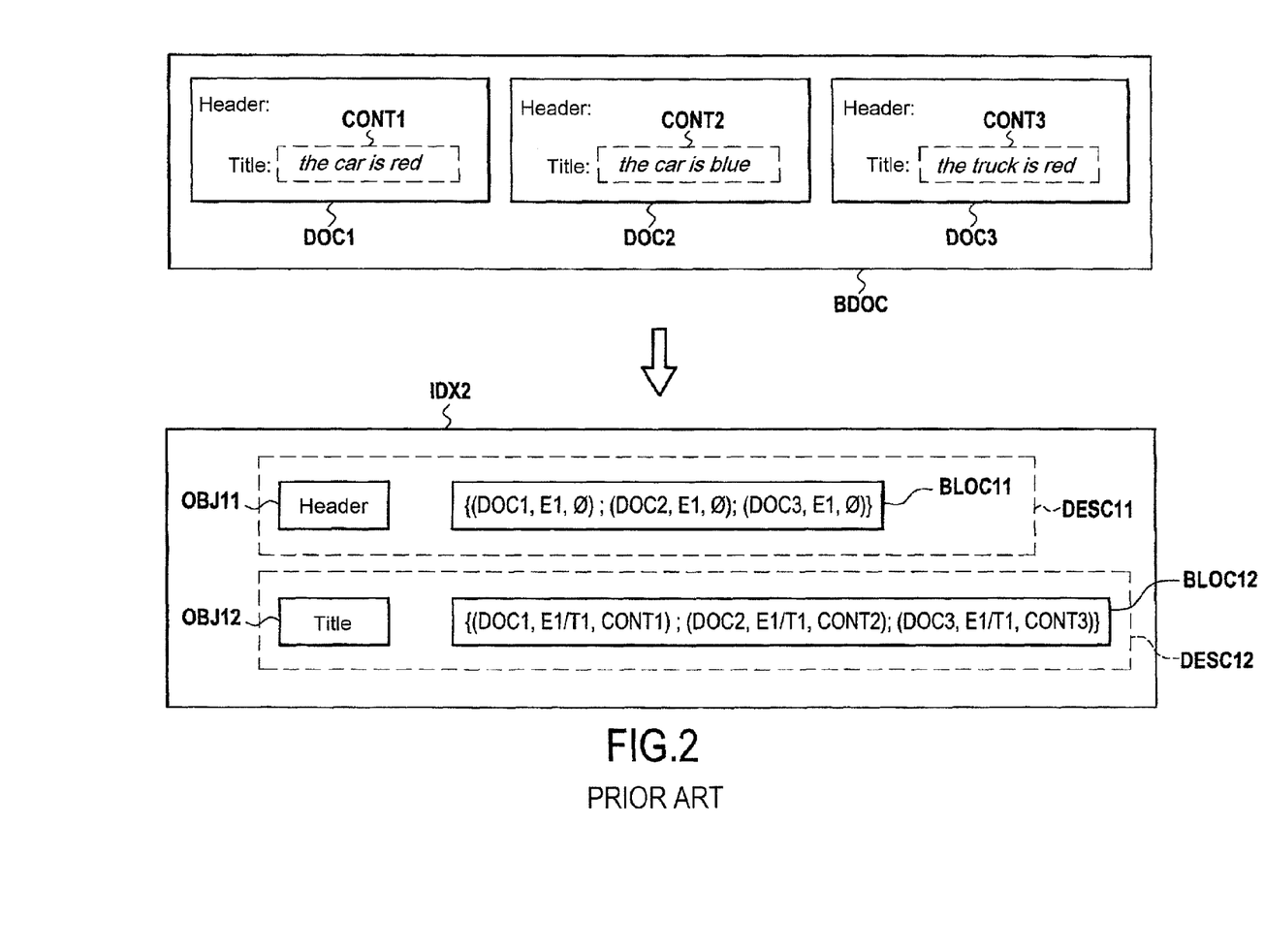

For example, in the example of FIG. 2, each of the documents DOC1 to DOC3 in the document base BDOC comprises two ordered fields having the names "Header" and "Title", with the content CONT1 of the field "Title" of document DOC1 being "the car is red".

For each field (e.g. OBJ12, "Title"), the inverted index IDX2 puts into association a block of information (BLOC12) comprising the documents (DOC1, DOC2, DOC3) of the document base that include this field, and the position of the field in the document (first title "T1" of first header "E1").

In the example of FIG. 2, the block BLOC12 also includes the content (CONT1, CONT2, CONT3) of the field in each of the documents, with an empty content being represented by the symbol "Ø".

Generalizing from FIGS. 1 and 2, each document of the document base BDOC may be considered as an ordered set of objects OBJi (words, fields), with the inverted index IDX1, IDX2 associating each of the objects OBJi with a block of information BLOCi that includes at least the documents that include said object and the position of the object in said documents.

Sometimes, an inverted index need not contain the positions of the objects in the documents.

The pair constituted by a word OBJi and its associated block of information BLOCi is commonly referred to as an "object descriptor" and is written DESCi.

Inverted indexes as described above are very practical since they make it easier to identify the documents in a document base that include a particular object (field or word), and when the inverted index also stores position, it enables said object to be located in the document.

Unfortunately, when using methods that are known in the state of the art, creating and updating inverted indexes for document bases that include a very large number of documents, e.g. several millions of documents, constitute operations that are excessively expensive in terms of computer computation time.

OBJECT AND SUMMARY OF THE INVENTION

The invention seeks to provide a method of updating an inverted index from at least one electronic document, which method does not present the drawbacks of methods known in the state of the art.

It should be observed that when the inverted index does not exist, then updating said inverted index means creating it.

More precisely, and in a first aspect, the invention provides a method of updating an inverted index from at least one electronic document, each electronic document being constituted by at least one ordered set of objects.

For each of the objects, the method comprises:
  a step of identifying a descriptor of said object, the descriptor being represented in the form of a tree;
  a step of determining a terminal leaf of said tree said determination comprising, if said terminal leaf does not exist, creating this terminal leaf and adding this terminal leaf to said tree, without any node suppression or any other reorganization of the tree; and
  a step for updating a packet of information of variable size pointed to by said leaf by concatenation, said packet of information including at least the list of said documents including said object.

Correspondingly, the invention provides a server suitable for updating an inverted index from at least one electronic document, the electronic document being constituted by at least one ordered set of objects.

The server comprises:
  means suitable for identifying, for each of said objects, a descriptor of said object, the descriptor being in the form of a tree;
  means for determining a terminal leaf of said tree said determination comprising, if said terminal leaf does not exist, creating this terminal leaf and adding this terminal leaf to said tree, without any node suppression or any other reorganization of the tree; and
  means for updating a packet of information of variable size pointed to by said leaf by concatenation, the packet of information including at least the list of said documents that include said object.

Adding a leaf to the tree includes adding its parents to the tree if they do not exist, in order to bind the terminal leaf to the root of the tree.

Most advantageously, the updating of an inverted index in accordance with the invention involves only the terminal leaves. Consequently, when adding one or more documents to the document base, updating or creating involves only the branches of each of the trees that represent the descriptors of all of the objects present in the added documents, thereby minimizing the modifications to be made in the document base.

It should be observed that creating or expanding each object descriptor for all of the objects of the documents is more advantageous in terms of memory size and computation time if a plurality of documents are processed simultaneously.

Consequently, the greater the number of documents that are processed at the same time, the greater the saving per document.

Most advantageously, for each object descriptor, the nodes of the tree, the packets of information, and the blocks of information can be stored in independent manner in the document base.

The packet of information pointed to by a leaf includes at least the list of documents that include the object.

In another embodiment, the packet of information further includes the position of the object in each of the documents of the list.

In a preferred embodiment, the packet of information further includes the version of the document, the method including a step of updating a data structure that is independent of the descriptor and that includes the most recent version of the at least one document.

This embodiment is particularly advantageous since, when a document is modified so as to no longer include an object in the inverted index, the method makes it possible to avoid updating the block of information itself, while merely updating the version number in the independent structure.

A very large amount of time is consequently saved when updating the information.

Various methods may be used for determining which terminal leaf is involved by the updating of the inverted index.

For example, the terminal leaf may be determined in random manner.

In a variant, the terminal leaf is determined by applying a predefined function to the identifiers of the document involved in the updating, e.g. a hashing function.

In accordance with this particular characteristic of the invention, if a given group of electronic documents is updated, the same terminal leaves are involved by the updating.

In a particular embodiment, the updating method of the invention includes a step of compressing the packet of information.

In a second aspect, the invention provides a method of processing a request for obtaining at least one electronic document, the request including at least one object.

The method comprises:
a step of obtaining a descriptor of said object, the descriptor being represented in the form of a tree;
a step of scanning said tree to at least one terminal leaf of said tree;
a step of obtaining a packet of information pointed to by said leaf, said packet including at least one identifier of a document that potentially includes said object; and
a presentation step for presenting the identifiers of said documents that are compatible with said request.

Correspondingly, the method provides a server suitable for processing a request to obtain at least one electronic document, the request including at least one object.

The server comprises:
means for obtaining a descriptor of said object, the descriptor being represented in the form of a tree;
means for scanning said tree to at least one terminal leaf of said tree;
means for obtaining a packet of information pointed to by said leaf, said packet including at least one identifier of a document that potentially includes said object; and
means for presenting the identifiers of said documents that are compatible with said request.

In its simplest form, the request for obtaining a document merely includes one object and the identifiers of documents that include said object are presented.

However, the invention makes it possible to process complex requests, e.g. seeking to obtain documents that include objects that satisfy a regular expression.

In this implementation, documents that are compatible with the request are those that satisfy the above-mentioned regular expression.

In accordance with the invention, in certain embodiments, it can happen that a document identified in a packet of information does not include the looked-for object. This happens in particular when the descriptor of the object also includes the version of the document at the time the descriptor was updated, with the descriptor not being modified in the event of a new version of the document being added to the document base.

More precisely, in this implementation, the packet of information includes a first version number of the document and the processing method of the invention further comprises:
a step of obtaining a second version number of said document from a data structure different from said descriptor; and
said presentation step taking account only of those identifiers for which the first and second version numbers are identical.

In any event, and most advantageously, when the server receives a request from the user to obtain documents that include an object, the server scans the tree associated with the object and deduces the response therefrom by reading the descriptor of said object without it being necessary to read all of the documents in the document base in order to encounter the looked-for objects therein.

When the list of documents to be found in response to a request is restricted to a subset of documents satisfying the regular expression, or some other criterion, the server reads the identifiers of the documents from the packets of information of the descriptor of the requested object, compares them with the list of identifiers that satisfy the regular expression, and retrieves only the blocks of information containing at least one identifier of the list.

This enables part of an object descriptor to be retrieved from the document base.

The invention also makes it possible to scan quickly through the contents of objects situated in the blocks of information in order to apply arbitrary comparison operators thereto via a dedicated interface, and to do so progressively while the blocks of information are being read, if they are read.

It is also possible to perform sorting.

In a particular embodiment, the various steps of the updating method and of the request processing method are determined by computer program instructions.

Consequently, the invention also provides a computer program on a data medium, the program being suitable for being implemented by a computer, the program including instructions adapted to implement the steps of the updating method or of the request-processing method as mentioned above.

The program may use any programming language, and may be in the form of source code, object code, or code intermediate between source code and object code, such as in a partially compiled form, or in any other desirable form.

The invention also provides a computer readable data medium including computer program instructions as mentioned above.

The data medium may be any entity or device capable of storing the program. For example, the medium may comprise storage means, such as read only memory (ROM), e.g. a compact disk (CD) ROM, or a microelectronic circuit ROM, or indeed any magnetic recording means, for example a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from a network of the Internet type.

Advantageously, the data medium may be an integrated circuit in which the program is incorporated, the circuit being adapted to execute or to be used in the execution of the method in question.

BRIEF DESCRIPTION OF THE DRAWINGS

Other characteristics and advantages of the invention appear from the following description made with reference to the accompanying drawings, which show an implementation having no limiting character. In the figures.

DETAILED DESCRIPTION OF THE INVENTION

In accordance with the invention, use is made of inverted indexes that are represented in the form of a tree.

Figure 3:
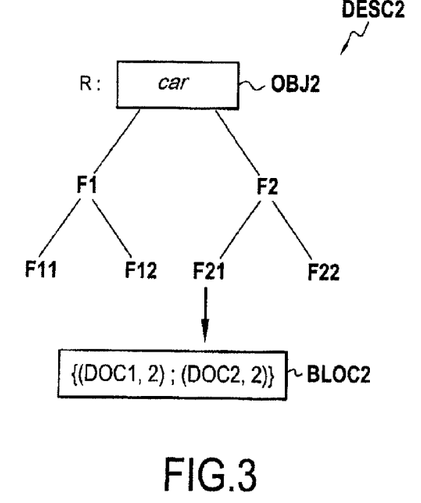
FIGS. 3 to 9 show inverted indexes obtained in accordance with updating methods in accordance with various implementations of the invention.

For example, FIG. 3 shows an inverted index in accordance with the invention obtained from the document base BDOC of FIG. 1.

More particularly, it comprises the inverted index of the word "car" (OBJ2).

In the example of FIG. 3, the descriptor DESC2 of the object "car" is a tree in which the root R is the identifier "car" of said object, the tree having two levels of leaves (first level: children F1, F2; second level: terminal leaves F11, F12, F21, and F22), at least some of the terminal leaves of the tree pointing to a packet of data constituted in this example by the BLOC2, itself already described with reference to FIG. 1. The node F1 is the parent of terminal leaves F11, F12, for example.

Figure 10:
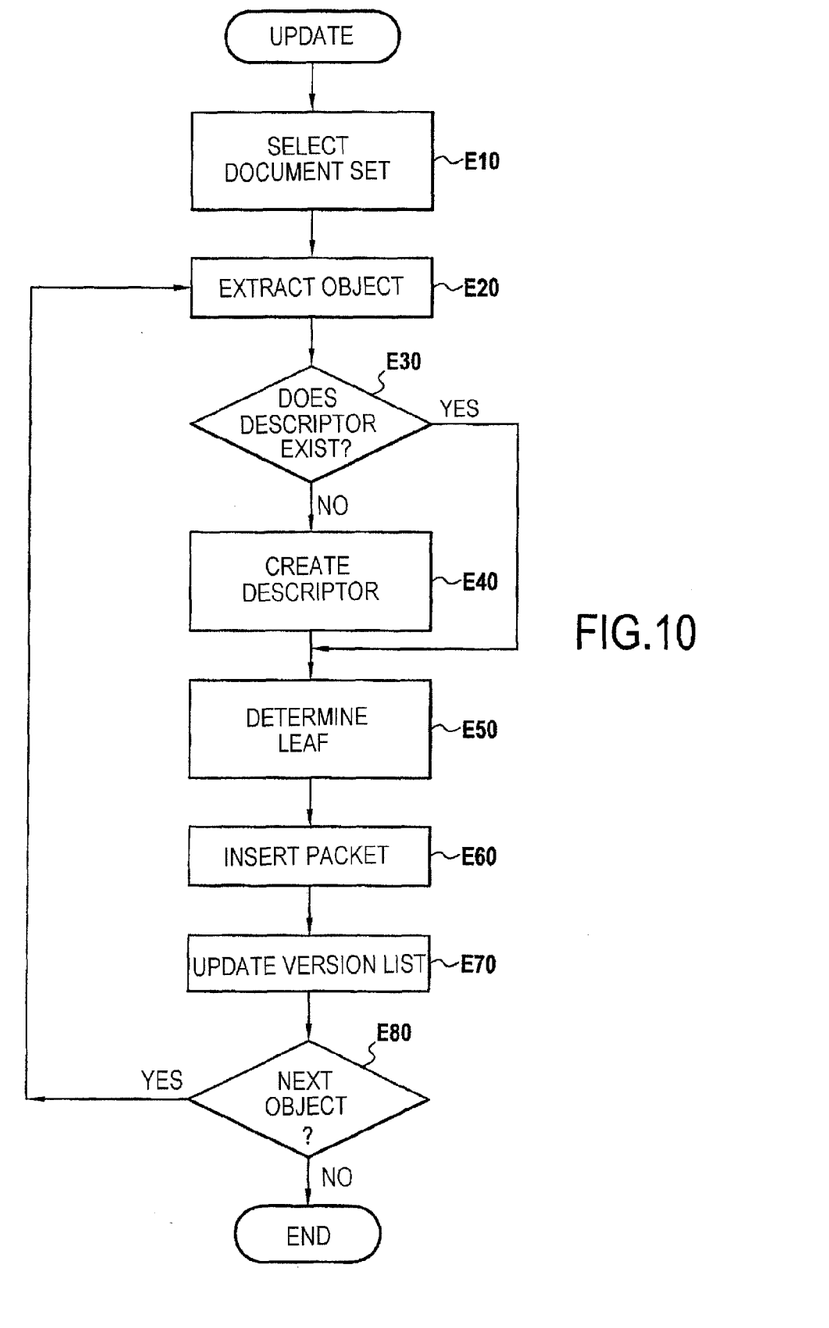
FIG. 10 is a flow chart showing the main steps of an updating method in accordance with a particular implementation of the invention.

With reference to FIG. 10, there follows a description of how the inverted index of FIG. 3 can be created or updated.

The updating method of the invention comprises a step E10 during which the user specifies the set of documents in the document base that are concerned with updating the inverted index. In this example, it is assumed that the documents are documents DOC1, DOC2, and DOC3 of FIG. 1.

The method then comprises a loop constituted by steps E20 to E80 for processing each of the objects of said set of documents.

In the example of FIG. 3, the objects are the words constituting the documents.

During a step E20, an object is extracted from the set of documents, e.g. the word "car".

Then, during a step E30, it is verified whether a descriptor exists for this object. When a word is detected for the first time in the set of documents, the descriptor does not exist; otherwise it exists already.

If the descriptor does not exist, it is created during a step E40.

In the example of FIG. 3, the tree constituting each of the descriptors is a two-level tree, the first level having two children F1, F2, and each of these children including, at a second level, two terminal leaves F11, F12 or F21, F22, respectively.

During a step E50, it is determined which terminal leaf of the tree is to be updated. If this leaf does not exist, this determination comprises creating same and adding it to the tree, possibly with its parents if they do not exist. Advantageously, the tree is not further reorganized. No node is deleted.

In other words, the invention only adds nodes to the tree but never delete any node. Not reorganizing the tree is very advantageous compared to B-Tree based solutions.

In a particular implementation of the invention, the leaf in question may be selected randomly from among the leaves F11, F12, F21, and F22.

In preferred manner, and as described herein, the leaf is determined by applying a function to the set of identifiers for the documents involved in the updating.

In the example described herein, this is done more particularly by applying a hashing function to the character string "DOC1 DOC2 DOC3".

It is assumed that the result of this hashing function is the identifier of the terminal leaf F21.

During a step E60, a packet of information pointed to by said leaf F21 is updated.

If the leaf does not point to any packet of information, then the updating consists merely in creating a logical link between the newly created leaf and the packet of information (BLOC2); if the leaf already points to a packet of information, then updating consists in concatenating the new packet (BLOC2) with the packet already pointed to by the terminal leaf F21.

In the implementation described herein, the packet is compressed during a step E65.

Thereafter, the following objects are processed, i.e. each of the words included in the set of documents DOC1, DOC2, DOC3.

Figure 4:
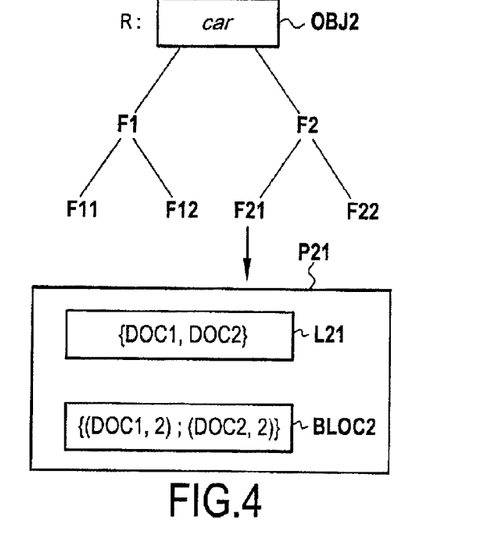

With reference to FIG. 4, it is possible to use a packet of information P21 comprising:

a list L21 of the identifiers of the documents DOC1, DOC2 that include the object being processed in the loop E20 to E80; and the data block BLOC2.

Figure 5:
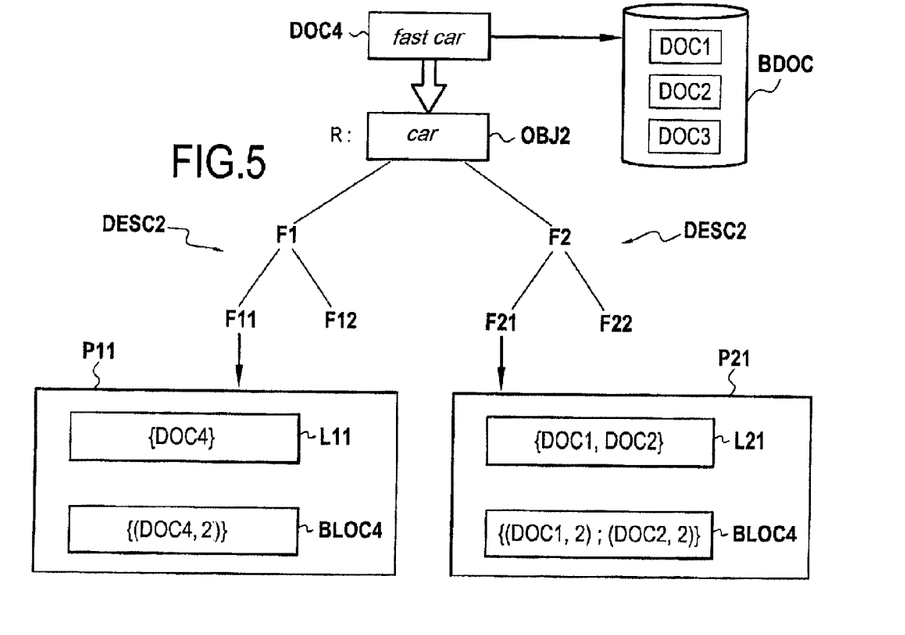

With reference to FIG. 5, it is assumed that a new document DOC4 is added to the document base BDOC.

The document DOC4 contains the set "fast car".

When the inverted index corresponding to the object "car" is updated, it is assumed in this example that the determination step E50 determines that the terminal leaf involved in this updating is the leaf F11.

The leaf F11 is then caused to point to a packet of information P11 comprising:

the identifiers of all of the documents involved by the updating that include the object "car", i.e. a list constituted by the singleton {DOC4}; and a block of information BLOC4 pointed to by the list L11; this block of information includes at least the position "2" of the object "car" in the document DOC4.

The packet 21 is not updated.

Figure 6:
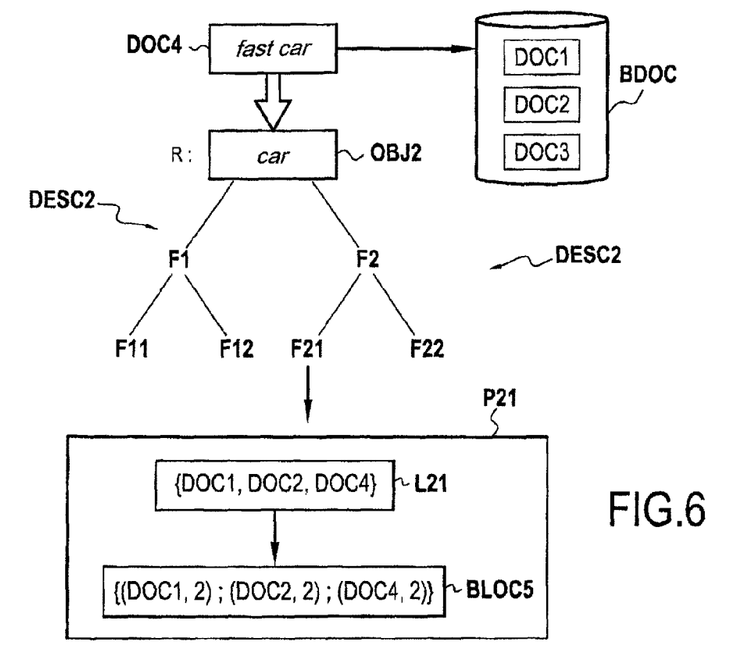

With reference to FIG. 6, there can be seen the result of the updating method when adding the document DOC4 to the document base BDOC if the result of determination step E50 produces the terminal leaf F21, i.e. the leaf that already points to the packet of information P21.

In this example, it can be seen that the list L21 of documents including the object "car" is increased with the identifier of the document DOC4, and that the block BLOC5 pointed to by this list now includes the block of information associated with the document DOC4, the information including the position 2 of the object "car" in this document.

Figure 7:
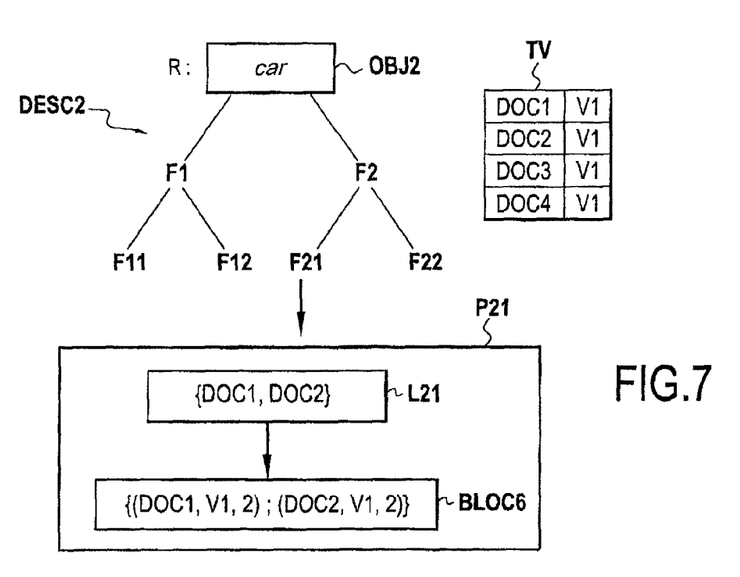

In the implementation of FIG. 7, the block of information further includes the version V1 of each document.

In this implementation, the updating method of the invention includes a set E70 of updating a data structure TV that is independent of the descriptor DESC2 and that includes the latest versions of the documents.

Thus, after adding the document DOC4 to the document base BDOC, the data structure TV includes, for each of the documents DOC1 to DOC4, the latest version V1 of these documents in the document base.

The block of information BLOC6 also includes this information for each of the documents.

Figure 8:
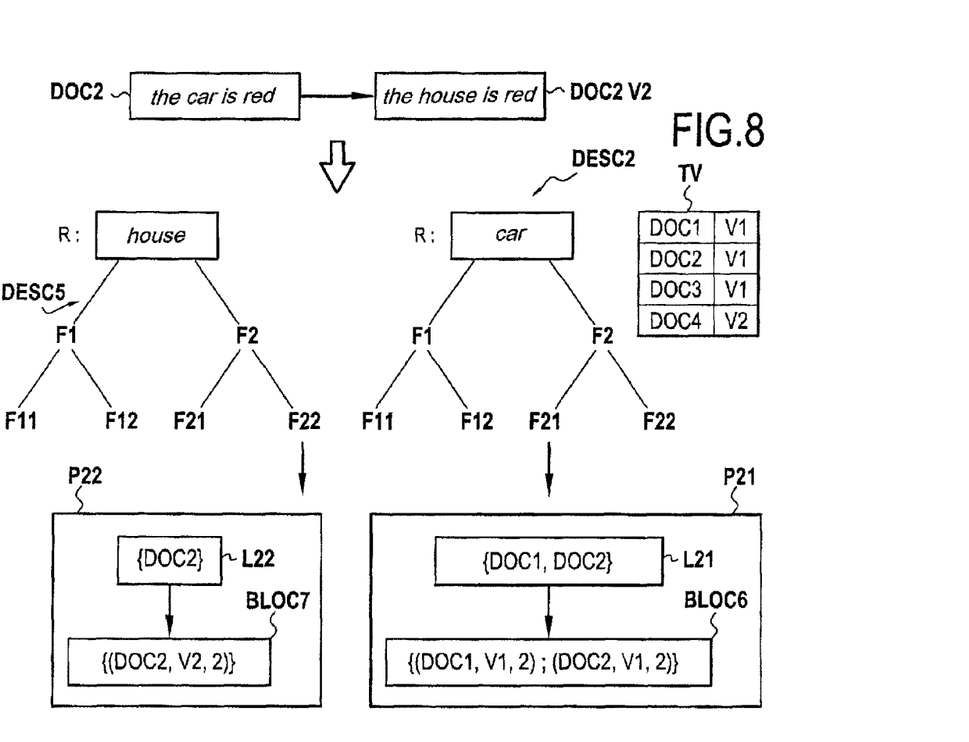

With reference to FIG. 8, it is assumed that the document DOC2 has been modified, with the version V2 of this document including the text "the house is red".

In accordance with this particular aspect of the invention, the data structure TV is updated, with the latest version V2 of the document DOC2 taking the place of the version V1.

In contrast, and in most advantageous manner, the descriptor of the word of the object "car" is not modified.

Naturally, a descriptor DESC5 is created for the object "house".

FIGS. 3 to 8 show descriptors in which the objects are words.

Figure 9:
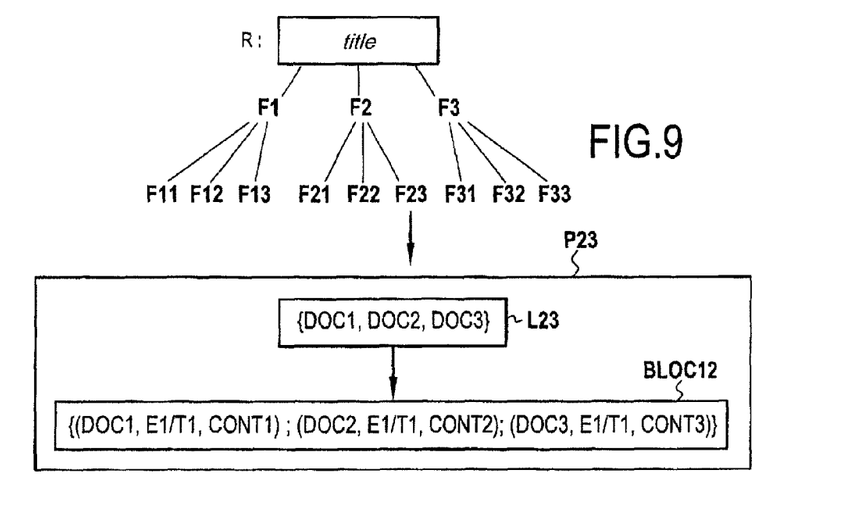

FIG. 9 shows a descriptor in accordance with the invention for an object constituted by the field "title".

This is a tree having two levels, the first level having three children F1, F2, F3, each child itself having three children (terminal leaves).

In this example, it is assumed that the updating of the index of the field "title" when the documents DOC1 to DOC3 are added to the document base involves the terminal leaf F23, with this leaf being determined during step E50 of the updating method of the invention.

In the example of FIG. 9, it should be observed that the terminal leaf F23 points to a packet of information P23 including the list L23 of documents DOC1, DOC2, DOC3 that include a field "title", this list pointing to the above-described block BLOC12.

Figure 11:
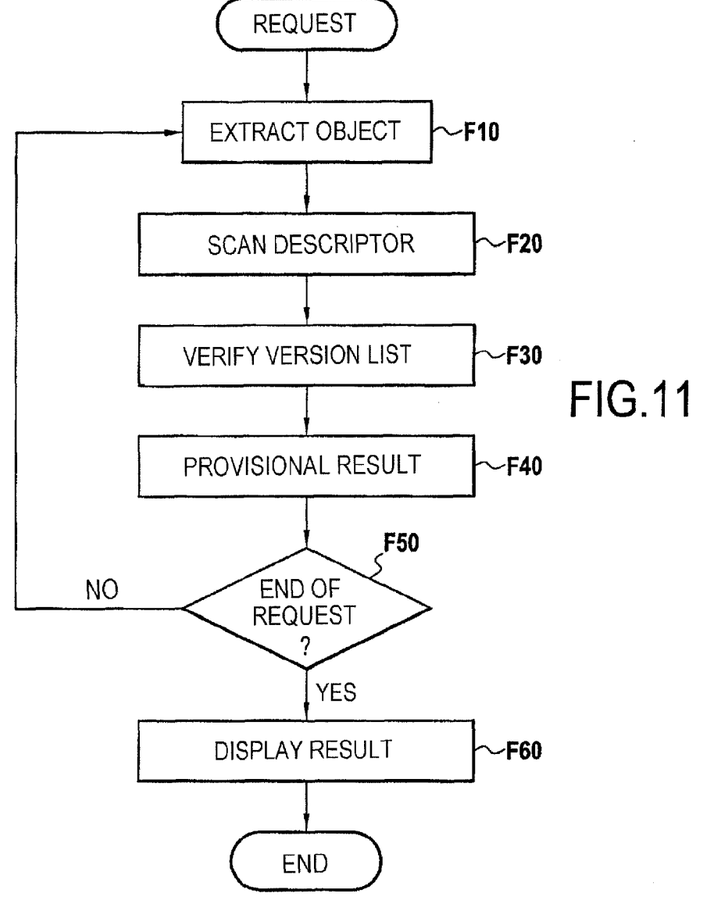
FIG. 11 is a flow chart showing the main steps of a method of processing a request in accordance with a particular implementation of the invention.

FIG. 11 shows the main steps of a method in accordance with a particular implementation of the invention for processing a request to obtain at least one electronic document.

Such a request may be input by a user in order to determine which documents include one or more objects.

For example, it is possible to use a request to determine the documents that include (object OBJ1 and object OBJ2) or (object OBJ1 or object OBJ2), it being possible to use any regular expression.

During a step F10, the first object is extracted from the request, and then the descriptor associated with the object is scanned as far as the terminal leaves of the tree (step F20).

This leads to the packets of information that are pointed to by said leaves (step F40), these packets including at least one identifier of a document that potentially includes the looked-for object.

In a particular implementation of the invention, it can happen that the document in question has been modified without the descriptor of the object being updated. This is the preferred implementation when use is made of version numbers.

Consequently, in order to make a final decision about retaining the document to which the terminal leaf of the tree points, it is verified in this example whether the version number of the document stored in the leaf is identical to that stored in the independent data structure TV (step F30).

Naturally, when no use is made of a version number, this verification step F30 is not performed; whether the object is a relevant response to the request is checked, for example, when accessing the documents corresponding to the request.

In any event, in step F40, a provisional list of documents is thus obtained, i.e. a list of documents that include the particular object that is being processed in the loop of steps F10 to F50.

Thereafter, all of the other objects in the request are processed, until the request is terminated (step F50).

A set of documents is thus obtained and the final result is shown to the user during a step F60, which result conserves only those documents that satisfy the regular expression included in the request (intersection or union of the sets of documents identified in each of the iterations of step F40).

Figure 12:
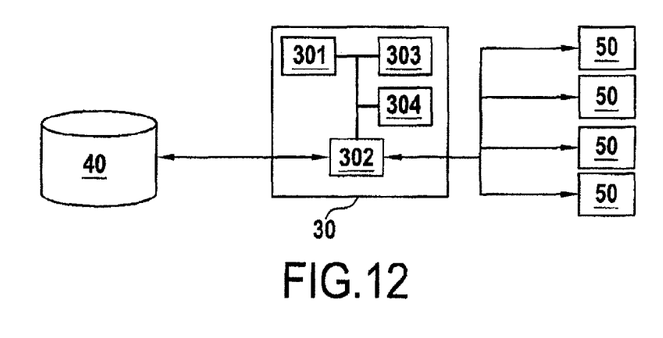
FIG. 12 shows a server in accordance with the invention in a particular embodiment.

FIG. 12 is a diagram of a server 30 in accordance with the invention.

The server may be used both to create an inverted index in accordance with the invention and to process a request for obtaining at least one electronic document included in a document base 40.

The server 30 has the hardware architecture of a conventional computer. It comprises a processor 301, a ROM 303 suitable for containing computer programs, a random access memory (RAM) 304 needed to enable the processor 301 to execute those programs, and communications means 302 constituted by a network card and software drivers.

The read only memory includes:
  a computer program in accordance with the invention having instructions for executing the steps of the index updating method complying with the flow chart described in FIG. 10; and
  a computer program in accordance with the invention having instructions for executing the steps of processing requests complying with the flow chart described with reference to FIG. 11.

In the example described herein, the server 30 is connected by a communications network (not referenced) to a plurality of client devices 50. The telecommunications network connecting the server 30 to the client devices may be of any type, and in particular it may be a local network of the Ethernet type or a public network of the Internet type.

The terminals 50 are used to request updating of the index from a set of documents added to the document base or modified therein, and to send requests that are processed in accordance with the invention in order to obtain certain documents from the document base that include at least one object contained in the request. The request may optionally contain a regular expression.

What is claimed is:

1. An updating method for updating an inverted index for at least one electronic document, each at least one electronic document being constituted by at least one ordered set of objects, the method comprising, for each of said objects:
  identifying a descriptor of said object, the object descriptor being represented in the form of a tree having hierarchically arranged nodes comprising a root node, first-level leaves and terminal leaves;

determining a terminal leaf of said tree, said determination comprising, if said terminal leaf does not exist, creating this terminal leaf and adding this terminal leaf to said tree, wherein a first level leaf or a terminal leaf is never deleted in the tree; and updating a packet of information of variable size pointed to by said terminal leaf by concatenating additional information thereto, said packet of information including at least a list of electronic documents including said object.

2. The updating method according to claim 1, wherein said packet of information further includes a position of said object in each of said electronic documents of the list.

3. The updating method according to claim 1, wherein said packet of information further includes a respective version number for each of said electronic documents in the list, the method further comprising updating a data structure that is independent of said object descriptor to include a most recent version number of each of said electronic documents in the list.

4. The updating method according to claim 1, wherein said terminal leaf is determined in a random manner.

5. The updating method according to claim 1, wherein said terminal leaf is determined by applying a predetermined function to an identifier of said at least one electronic document.

6. The updating method according to claim 1, including compressing said packet of information.

7. The updating method according to claim 1, wherein the tree is only reorganized by an additional of a leaf to the tree and not further reorganized thereafter until a subsequent addition of a subsequent leaf to the tree, and wherein the adding the terminal leaf to said tree does not lead to suppressing or deleting a first level leaf or a terminal leaf or any other reorganization of the tree.

8. A method of processing a request to obtain at least one electronic document, said request including at least one requested object, the method comprising:
   obtaining a descriptor of said requested object, the requested object descriptor being represented in the form of a tree having hierarchically arranged nodes comprising a root node, first-level leaves and terminal leaves;
   scanning said tree to determine at least one terminal leaf of said tree;
   obtaining a packet of information pointed to by said determined at least one terminal leaf, said packet including at least one identifier of at least one electronic document that potentially includes said requested object; and
   presenting the identifier of said electronic documents that are compatible with said request, wherein the tree is of a type where a first level leaf or a terminal leaf is never deleted in the tree.

9. The method according to claim 8, wherein said request includes a regular expression, the method further comprising the electronic document identifiers being filtered as a function of said regular expression.

10. The method according to claim 8, wherein said packet of information includes a respective first version number for each of said electronic documents, wherein the method further comprises:
   obtaining a respective second version number for each of said electronic documents from a data structure different from said object descriptor; and
   wherein presenting the electronic document identifiers comprises only presenting those electronic document identifiers for electronic documents for which the respective first and second version numbers are identical.

11. A server for updating an inverted index for at least one electronic document, each of at least one electronic document being constituted by at least one ordered set of objects, the server comprising:
   means for identifying, for each of said objects, a descriptor of said object, the object descriptor being in the form of a tree having hierarchically arranged nodes comprising a root node, first-level leaves and terminal leaves;
   means for determining a terminal leaf of said tree, said determination comprising, if said terminal leaf does not exist, creating this terminal leaf and adding this terminal leaf to said tree, wherein a first level leaf or a terminal leaf is never deleted in the tree; and
   means for updating a packet of information of variable size pointed to by said terminal leaf by concatenating additional information thereto, the packet of information including at least a list of electronic documents that include said object.

12. A non-transitory computer-readable recording medium having recorded thereon a computer program including instructions which cause a computer to execute a method of updating an inverted index for at least one electronic document, each of at least one electronic document being constituted by at least one ordered set of objects, the method comprising, for each of said objects:
   identifying a descriptor of said objects, the object descriptor being represented in the form of a tree having hierarchically arranged nodes comprising a root node, first-level leaves and terminal leaves;
   determining a terminal leaf of said tree, said determination comprising, if said terminal leaf does not exist, creating this terminal leaf and adding this terminal leaf to said tree, wherein a first level leaf or a terminal leaf is never deleted in the tree; and
   updating a packet of information of variable size pointed to by said terminal leaf by concatenating additional information thereto, said packet of information including at least a list of electronic documents including said object.

13. A server for processing a request to obtain at least one electronic document from an inverted index, the request including at least one requested object, the server comprising:
   means for obtaining a descriptor of said requested object, the requested object descriptor being represented in the form of a tree having hierarchically arranged nodes comprising a root node, first-level leaves and terminal leaves;
   means for scanning said tree to determine at least one terminal leaf of said tree;
   means for obtaining a packet of information pointed to by said determined at least one terminal leaf, said packet including at least one identifier of at least one electronic document that potentially includes said requested object; and
   means for presenting the identifiers of said electronic documents that are compatible with said request, wherein the tree is of a type where a first level leaf or a terminal leaf is never deleted in the tree.

14. A non-transitory computer-readable recording medium having recorded thereon a computer program including instructions which cause a computer to execute the method of processing a request to obtain at least one electronic document from an inverted index, said request including at least one requested object, the method comprising:
   obtaining a descriptor of said requested object, the requested object descriptor being represented in the form of a tree having hierarchically arranged nodes comprising a root node, first-level leaves and terminal leaves;

scanning said tree to determine at least one terminal leaf of said tree;

obtaining a packet of information pointed to by at least one terminal leaf, said packet including at least one identifier of at least one electronic document that potentially includes said requested object; and presenting the identifiers of said electronic documents that are compatible with said request, wherein the tree is of a type where a first level leaf or a terminal leaf is never deleted in the tree.

* * * * *